United States Patent Office 3,235,573
Patented Feb. 15, 1966

3,235,573
19-LOWER ALKYLIDENE AND 19-OXO-Δ⁴-ANDRO-STEN-17β-OL-3-ONE DERIVATIVES
Albert Bowers, Mexico City, Mexico, assignor to Syntex Corporation, Panama, Panama, a corporation of Panama
No Drawing. Filed Dec. 20, 1962, Ser. No. 246,018
The portion of the term of the patent subsequent to Aug. 27, 1980, has been disclaimed
15 Claims. (Cl. 260—397.4)

The present invention relates to novel cyclopentanophenanthrene derivatives and to a process for the production thereof.

More particularly the present invention relates to novel 19-methylene, 19-alkylidene and 19-oxo-Δ⁴-10α-androsten-17β-ol-3-one derivatives.

The novel compounds of the present invention are represented by the following formulae:

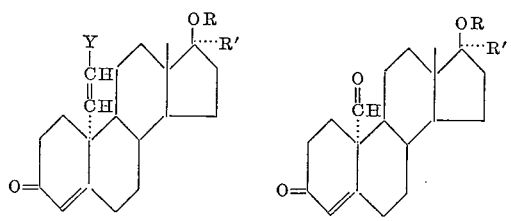

In the above formulae Y represents hydrogen or a lower alkyl group, R represents hydrogen or a hydrocarbon carboxylic acyl group of less than 12 carbon atoms; and $R^1$ represents hydrogen, lower alkyl, lower alkenyl or lower alkinyl.

The acyl group is derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formulae are anabolic-androgenic agents with a favorable anabolic-androgenic ratio. In addition, they have anti-estrogenic, anti-gonadotrophic, anti-filbrillatory and appetite stimulating properties. Furthermore they lower the blood cholesterol level, relieve premenstrual tension and suppress the output of the pituitary gland.

The novel compounds of the present invention are prepared by the process exemplified by the following equation:

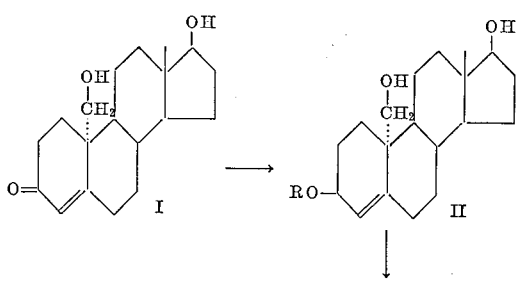

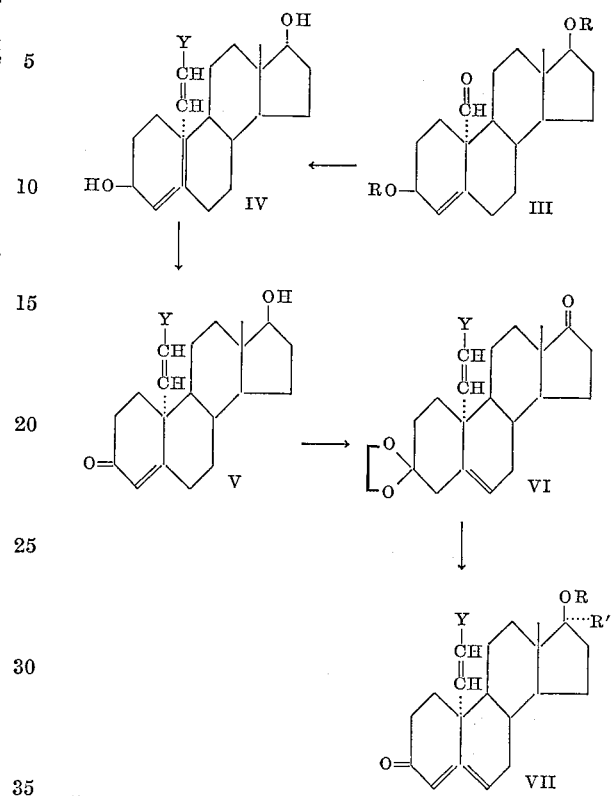

In the above formulae R, $R^1$, and Y have the same meaning as set forth hereinbefore.

In practicing the process outlined above the starting 19-hydroxy-10α-testosterone (I) is reduced, preferably with sodium borohyride, to give Δ⁴-10α-androstene-3β,17β,19-triol (II: R=H), which is selectively acylated in the 3,17-positions, by treatment with triphenylmethyl chloride in pyridine, preferably at steam bath temperature, to give the corresponding 19-trithyl ether. Next conventional acylation in pyridine, preferably with acetic anhydride, and acid treatment, preferably with hydrogen bromide in acetic acid, affords the corresponding Δ⁴-10α-androstene-3β,17β,19-triol - 3,17 - diacylate (II: R=acyl). The latter compound is oxidized, preferably with pyridine-chromium trioxide, thus giving the corresponding Δ⁴-10α-androstene-3β,17β-diol-19-al-3,17 - diacylate (III: R=acyl). The latter 19-aldehyde is treated with a triphenylphosphonium lower alkyl halide, such as triphenyl phosphonium methyl or ethyl bromide, in a suitable solvent, such as anhydrous ether in the presence of a lower alkyl-lithium, such as butyl-lithium, thus affording the corresponding 19-methylene or lower alkylidene-Δ⁴-10α-androstene-3β,17β-diol (IV), which upon treatment with approximately 1 molar equivalent of 2,3-dichloro-5,6-dicyano-1,4-benzoquinone at room temperature for a period of time of approximately 10 hours, yields the corresponding 19-methylene or lower alkylidene-Δ⁴-10α-androsten-17β,-ol-3-one (V). The latter Δ⁴-3-ketone is treated with ethylene glycol in the presence of p-toluenesulfonic acid, in a suitable solvent, such as benzene, preferably at reflux temperature for a period of time of approximately 10 hours, thus giving the corresponding 3-cycloethylenedioxy-19-methylene or lower alkylidene-Δ⁵-10α-androsten-17β-ol, which upon oxidation in a mildly basic or neutral medium, such as chromium trioxide in pyridine, yields the corresponding 3-cycloethylenedioxy- 19-methylene or lower alkylidene-Δ⁵-10α-androsten-17-one compound (VI). The latter 17-ketone, upon treatment with a lower (alkyl, alkenyl, or alkinyl) magnesium halide, such as methyl, vinyl or ethinyl magnesium bromide, in a suitable anhydrous solvent, e.g. benzene, ether, and the like, preferably at reflux temperature for a period of time of approximately 3 hours, yields the corresponding 3-cycloethylenedioxy-17α-lower (alkyl, alkenyl or alkinyl) - 19 - methylene or lower alkylidene-Δ⁵-10α-androsten-17β-ol, which upon conventional treatment in an acid medium affords the corresponding Δ⁴-3-ketone (VII).

The novel 19-oxo compounds of the present invention are prepared by the process exemplified by the following equation:

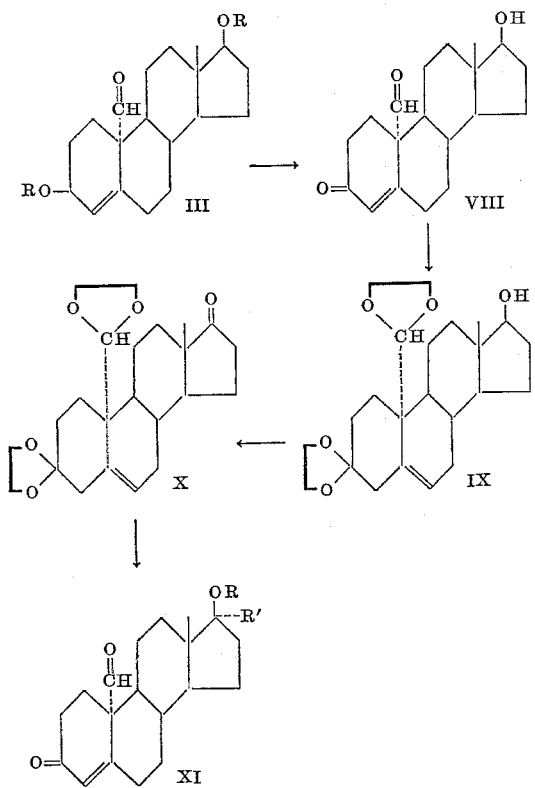

In the above formulae R and R¹ have the same meaning as heretofore.

In proceeding in accordance with the latter equation, the Δ⁴ - 10α-androstene-3β,17β-diol-19-al-3,17-diacylate (III: R=acyl) prepared by the process delineated hereinbefore, is saponified conventionally in an alkaline medium to give Δ⁴-10α-androstene-3β,17β-diol-19-al, which upon treatment with approximately 1 molar equivalent of 2,3-dichloro-5,6-dicyano-1,4-benzoquinone at room temperature for a period of time of approximately 10 hours, yields Δ⁴ - 10a - androstene-17β-ol-19-al-3-one (VIII). Treatment of the latter compound with ethylene glycol in the presence of p-toluenesulfonic acid in a suitable solvent, such as benzene, preferably at reflux temperature for a period of time of approximately 10 hours, produces 3,19-bis-cycloethylenedioxy-Δ⁵-10α-androsten-17β-ol (IX), which is oxidized in a mildly basic or neutral medium, such as chromium trioxide in pyridine, to give 3,19-cycloethylenedioxy-Δ⁵-androsten-17-one (X). The latter compound, upon treatment with a lower alkyl, alkinyl, alkenyl) magnesium halide, such as methyl, vinyl or ethinyl magnesium halide, e.g., methyl, vinyl or ethinyl magnesium bromide, in a suitable anhydrous solvent, e.g. benzene, ethyl and the like, preferably at reflux temperature for a period of time of the order of 3 hours, affords the corresponding 17α-lower (alkyl, alkenyl or alkinyl)-17β-ol, which is treated in an acid medium under conventional conditions to produce the corresponding 17α-substituted Δ⁴-10α-androsten-17β-ol-19-al-3-one (XI).

The compounds of the present invention having a secondary hydroxyl group are conventionally acylated in pyridine with a suitable acylating agent, such as a chloride or an anhydride of a hydrocarbon carboxylic acid of the type defined hereinbefore, thus affording the corresponding acylates.

The compounds of the present invention having in the molecule a tertiary hydroxyl group are conventionally esterified, in the presence of p-toluenesulfonic acid, with an acylating agent such as acetic anhydride, caproic anhydride, cyclopentylpropionic anhydride or enanthic anhydride, to produce the corresponding esters.

The following specific examples serve to illustrate, but are not intended to limit the scope of the present invention:

Example I

A solution of 1 g. of sodium borohydride in 3 cc. of water was added to an ice-cooled solution of 1 g. of 19-hydroxy-10α-testosterone (Sondheimer et al., Tetrahedron Letters, No. 22, 38 (1960)) in 120 cc. of methanol and the mixtuer was allowed to stand for 16 hours at room temperature. The excess reagent was decomposed by addition of acetic acid, and the solution concentrated to small volume in vacuo and diluted with water. The product was extracted with ethyl acetate, the extract was washed with water, dried and evaporated. The solid residue was purified by crystallization from acetone-hexane to give Δ⁴-10α-androstene-3β,17β,19-triol (Cpd. No. 1).

Example II

A mixture of 1 g. of Δ⁴-10α-androstene-3β,17β,19-triol (Cpd. No. 1), 3 g. of triphenylmethyl chloride and 15 cc. of pyridine was heated on a steam bath for 2 hours, then it was cooled to 5° C. and 2 cc. of acetic anhydride were added. The resulting mixture was kept at the same temperature for 24 hours, then it was poured slowly into ice-water and the resulting precipitate collected by filtration and dried. The dry solid was mixed thoroughly with 20 cc. of acetic acid and there were added 3 cc. of a saturated solution of hydrogen bromide in acetic acid. The resulting mixture was stirred for 3 minutes, then poured into ice-water and the formed precipitate collected by filtration, washed with water, dried, chromatographed over alumina and crystallized from acetone-hexane, thus yielding Δ⁴-10α-androstene-3β,17β,19-triol 3,17-diacetate (Cpd. No. 2).

Example III

A solution of 6 g. of Δ⁴-10α-androstene-3β,17β,19-triol 3,17-diacetate (Cpd. No. 2) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded Δ⁴-10α-androstene-3β,17β-diol-19-al-3,17-diacetate (Cpd. No. 3).

Example IV

A suspension of 20 g. of triphenylphosphonium methyl bromide in 250 cc. of anhydrous ether was treated, under an atmosphere of nitrogen, with 55 cc. of a 1 N ethereal solution of butyl lithium and the mixture was stirred for 2 hours at room temperature. A solution of 5 g. of Cpd. No. 3 in 100 cc. of ether was then added dropwise in the course of 15 minutes and with stirring. The reaction mixture was stirred for 5 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave 19-methylene-$\Delta^4$-10α-androstene-3β,17β-diol (Cpd. No. 4).

Example V

The Compound No. 3 was treated according to the procedure described in the preceding example, except that triphenylphosphonium ethyl bromide was used instead of triphenylphosphonium methyl bromide, thus giving 19-ethylidene-$\Delta^4$-10α-androstene-3β,17β-diol (Cpd. No. 5).

Example VI

A mixture of 1 g. of 19-methylene-$\Delta^4$-10α-androstene-3β,17β-diol (Cpd. No. 4) in 20 cc. of dioxane, and 1.1 molar equivalents of 2,3-dichloro, 5,6-dicyano, 1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 19-methylene-$\Delta^4$-10α-androsten-17β-ol-3-one (Cpd. No. 6).

Upon treatment of Compound No. 5 by the same procedure, there was produced 19-ethylidene-$\Delta^4$-10α-androsten-17β-ol-3-one (Cpd. No. 7).

Example VII

A mixture of 5 g. of 19-methylene-$\Delta^4$-10α-androsten-17β-ol-3-one (Cpd. No. 6), 150 cc. of anhydrous benzene, 60 cc. of ethylene glycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3-cycloethylenedioxy-19-methylene-$\Delta^5$-10α-androsten-17β-ol (Cpd. No. 8).

When applying the latter procedure to Compound No. 7, there was obtained 3-cycloethylenedioxy-19-ethylidene-$\Delta^5$-10α-androsten-17β-ol (Cpd. No. 9).

Example VIII

The Compounds Nos. 8 and 9, were treated following the procedure described in Example III, thus furnishing respectively: 3-cycloethylenedioxy-19-methylene-$\Delta^5$-10α-androsten-17-one (Cpd. No. 10) and 3-cycloethylenedioxy-19-ethylidene-$\Delta^5$-10α-androsten-17-one (Cpd. No. 11).

Example IX

A solution of 5 g. of Compound No. 10 in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3-cycloethylenedioxy-17α-methyl-19-methylene-$\Delta^5$-10α-androsten-17β-ol (Cpd. No. 12). The Compound No. 11 was treated by the same procedure, thus giving 3-cycloethylenedioxy - 17α - methyl - 19 - ethylidene - $\Delta^5$-10α-androsten-17β-ol (Cpd. No. 13).

Example X

The Compounds Nos. 10 and 11 were treated according to Example IX, except that vinyl magnesium bromide was used instead of methyl magnesium bromide, thus affording respectively 3-cycloethylenedioxy-17α-vinyl-19-methylene-$\Delta^5$-10α-androsten-17β-ol (Cpd. No. 14) and 3-cycloethylene - dioxy - 17α - vinyl - 19 - ethylidene - $\Delta^5$-10α-androsten-17β-ol (Cpd. No. 15).

Example XI

The Compounds Nos. 10 and 11 were treated in accordance with Example IX, except that methyl magnesium bromide was substituted by ethinyl magnesium bromide, thus giving respectively 3-cycloethylenedioxy-17α-ethinyl-19-methylene-$\Delta^5$-10α-androsten-17β-ol (Cpd. No. 16) and 3-cycloethylenedioxy-17α-ethinyl-19-ethylidene-$\Delta^5$-10α-androsten-17β-ol (Cpd. No. 17).

Example XII

A solution of 500 mg. of Compound No. 12 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 17α-methyl-19-methylene-$\Delta^4$-10α-androsten-17β-ol-3-one (Cpd. No. 18).

The Compounds Nos. 13 to 17, inclusive, were treated according to the latter procedure, thus yielding respectively:

Cpd. No.:
  19. 17α-methyl-19-ethylidene-$\Delta^4$-10α-androsten-17β-ol-3-one,
  20. 17α-vinyl-19-methylene-$\Delta^4$-10α-androsten-17β-ol-3-one,
  21. 17α-vinyl-19-ethylidene-$\Delta^4$-10α-androsten-17β-ol-3-one,
  22. 17α-ethinyl-19-methylene-$\Delta^4$-10α-androsten-17β-ol-3-one,
  23. 17α-ethinyl-19-ethylidene-$\Delta^4$-10α-androsten-17β-ol-3-one.

Example XIII

A suspension of 1 g. of $\Delta^4$-10α-androstene-3β,17β-diol-19-al 3,17-diacetate (Cpd. No. 3) in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield $\Delta^4$-10α-androstene-3β,17β-diol-19-al (Cpd. No. 24).

Example XIV

The Compound No. 24 was successively treated by the procedures described in Examples VI, VII, VIII, and IX, thus yielding respectively:

Cpd. No.:
  25. $\Delta^4$-10α-androsten-17β-ol-19-al-3-one,
  26. 3,19-biscycloethylenedioxy-$\Delta^5$-10α-androsten-17β-ol,
  27. 3,19-biscycloethylenedioxy-$\Delta^5$-10α-androsten-17-one,
  28. 3,19-biscycloethylenedioxy-17α-methyl-$\Delta^5$-10α-androsten-17β-ol.

Example XV

The Compound No. 27 was treated according to Examples X and XI, affording respectively: 3,19-biscycloethylenedioxy-17α-vinyl-$\Delta^5$-10α-androsten-17β - ol (Cpd. No. 29) and 3,19-biscycloethylenedioxy-17α-ethinyl-$\Delta^5$-10α-androsten-17β-ol (Cpd. No. 30).

Example XVI

The Compounds Nos. 27 to 30, inclusive were treated according to Example XII, thus giving respectively:

Cpd. No.:
  31. $\Delta^4$-10α-androsten-19-al-3,17-dione,
  32. 17α-methyl-$\Delta^4$-10α-androsten-17β-ol-19-al-3-one,
  33. 17α-vinyl-$\Delta^4$-10α-androsten-17β-ol-19-al-3-one,
  34. 17α-ethinyl-$\Delta^4$-10α-androsten-17β-ol-19-al-3-one.

Example XVII

A mixture of 1 g. of 19-methylene-Δ⁴-10α-androsten-17β-ol-3-one (Cpd. No. 6), 4 cc. of pyridine and 2 cc. of acetic anhydride was kept at room temperature overnight, poured into ice water, the formed precipitate was filtered, washed with water, and dried. Crystallization from acetone-hexane gave 19-methylene-Δ⁴-10α-androsten-17β-ol-3-one acetate (Cpd. No. 35).

The Compounds Nos. 7 and 25 were treated by the same procedure, thus giving 19-ethylidene-Δ⁴-10α-androsten-17β-ol-3-one acetate (Cpd. No. 36) and Δ⁴-10α-androsten-17β-ol-19-al-3-one acetate (Cpd. No. 37).

Example XVIII

The starting compounds of Example XVII were treated following exactly the procedure described in that example, except that acetic anhydride was substituted by caproic anhydride, propionic anhydride, enanthic anhydride and cyclopentylpropionic anhydride, thus affording respectively the corresponding caproates, propionates, enanthates and cyclopentylpropionates of said starting compounds.

Example XIX

To a solution of 5 g. of 17α-methyl-19-methylene-Δ⁴-10α-androsten-17β-ol-3-one (Cpd. No. 18) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α-methyl-19-methylene-Δ⁴-10α-androsten-17β-ol-3-one caproate (Cpd. No. 38).

The Compounds Nos. 19, 20, 21, 22, 23, 32, 33 and 34 were treated by the same procedure, thus yielding respectively:

Cpd. No.:
  39. 17α-methyl-19-ethylidene-Δ⁴-10α-androsten-17β-ol-3-one caproate,
  40. 17α-vinyl-19-methylene-Δ⁴-10α-androsten-17β-ol-3-one caproate,
  41. 17α-vinyl-19-ethylidene-Δ⁴-10α-androsten-17β-ol-3-one caproate,
  42. 17α-ethinyl-19-methylene-Δ⁴-10α-androsten-17β-ol-3-one caproate,
  43. 17α-ethinyl-19-ethylidene-Δ⁴-10α-androsten-17β-ol-3-one caproate,
  44. 17α-methyl-Δ⁴-10α-androsten-17β-ol-19-al-3-one caproate,
  45. 17α-vinyl-Δ⁴-10α-androsten-17β-ol-19-al-3-one caproate,
  46. 17α-ethinyl-Δ⁴-10α-androsten-17β-ol-19-al-3-one caproate.

Example XX

The starting compounds of Example XIX were treated following exactly the procedure described in that example, except that caproic anhydride was substituted by acetic anhydride, propionic anhydride, enanthic anhydride and cyclopentylpropionic anhydride, thus affording respectively the corresponding acetates, propionates, enanthates and cyclopentylpropionates of said starting compounds.

I claim:
1. A compound of the following formula:

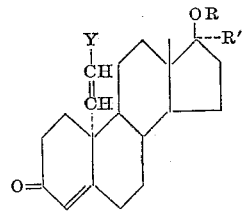

wherein Y is selected from the group consisting of hydrogen and lower alkyl; R is a member of the group consisting of hydrogen and a hydrocarbon carboxylic acyl group of less than 12 carbon atoms; and R¹ is a member of the group consisting of hydrogen, lower alkyl, lower alkenyl, and lower alkinyl.

2. A compound of the following formula:

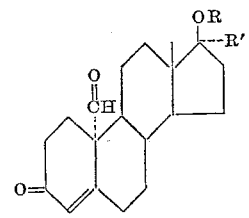

wherein R is selected from the group consisting of hydrogen and a hydrocarbon carboxylic acyl group of less than 12 carbon atoms; and R¹ is a member of the group consisting of lower alkyl, lower alkenyl and lower alkinyl.

3. 19-methylene-Δ⁴-10α-androstene-3β,17β-diol.
4. 19-ethylidene-Δ⁴-10α-androstene-3β,17β-diol.
5. 19-methylene-Δ⁴-10α-androsten-17β-ol-3-one.
6. 19-ethylidene-Δ⁴-10α-androsten-17β-ol-3-one.
7. 17α-methyl-19-methylene-Δ⁴-10α-androsten-17β-ol-3-one.
8. 17α-methyl-19-ethylidene-Δ⁴-10α-androsten-17β-ol-3-one.
9. 17α-vinyl-19-methylene-Δ⁴-10α-androsten-17β-ol-3-one.
10. 17α-vinyl-19-ethylidene-Δ⁴-10α-androsten-17β-ol-3-one.
11. 17α-ethinyl-19-methylene-Δ⁴-10α-androsten-17β-ol-3-one.
12. 17α-ethinyl-19-ethylidene-Δ⁴-10α-androsten-17β-ol-3-one.
13. 17α-methyl-Δ⁴-10α-androsten-17β-ol-19-al-3-one.
14. 17α-vinyl-Δ⁴-10α-androsten-17β-ol-19-al-3-one.
15. 17α-ethinyl-Δ⁴-10α-androsten-17β-ol-19-al-3-one.

References Cited by the Examiner

UNITED STATES PATENTS 3,014,931   12/1961   Nishikawa _____ 260—397.1
3,102,127   8/1963    Bowers _____ 260—397.4

FOREIGN PATENTS 929,271   6/1963   Great Britain.

OTHER REFERENCES

Westerof et al.: "Fec. Trav. Chem. Pays-Bas.," vol. 80 (1961), pages 1048 to 1056 relied on.

LEWIS GOTTS, *Primary Examiner.*